United States Patent [19]

Christopherson

[11] Patent Number: 4,934,408
[45] Date of Patent: Jun. 19, 1990

[54] BALL VALVE

[76] Inventor: Rollin F. Christopherson, 5756 S. Willowwood La., South Ogden, Utah 84403

[21] Appl. No.: 318,342

[22] Filed: Mar. 3, 1989

[51] Int. Cl.⁵ .................. F16K 11/00; F16K 31/44
[52] U.S. Cl. .................. 137/625.46; 251/192; 251/162; 251/163; 251/256
[58] Field of Search .......... 137/625.46; 251/162, 251/163, 180, 192, 255, 256

[56] References Cited

U.S. PATENT DOCUMENTS

| | | | |
|---|---|---|---|
| 440,025 | 11/1890 | Fisher | 251/273 X |
| 444,514 | 1/1891 | Walker | 251/255 |
| 852,155 | 4/1907 | Bashlin | 251/255 |
| 900,598 | 10/1908 | Schuerman | 251/255 |
| 2,650,059 | 8/1953 | Hjulian et al. | 251/192 X |
| 3,176,720 | 4/1965 | Donahue | 137/625.44 |
| 3,180,362 | 4/1965 | Muller | 251/163 X |
| 3,368,790 | 2/1968 | Burke et al. | 251/298 X |
| 3,675,894 | 7/1977 | Friedell | 251/163 |
| 3,934,849 | 1/1976 | Morain et al. | 251/259 X |

Primary Examiner—John Rivell
Attorney, Agent, or Firm—M. Reid Russell

[57] ABSTRACT

Flow control valves (10) and (80) each include a cylindrical body (11) or (82) that is open through a number of ports (13), (14) and (15), the ports to be opened and closed by a resilient ball (16) that is selectively moved into and out of alignment with each port by lowering and turning a valve basket (15) and (60). The valve basket has co-planer essentially parallel arms that extend from ends of a web wherebetween the resilient ball is caged, which valve basket is secured to the end of a valve basket stem (19) or (89). The valve gasket is displaced vertically and turned by an actuator (48) or (94), through a handle (49) or (109), the turning of which handle operates through a system of opposing upper and lower cams (40) and (23) or a clutch cam system (81) to both vertically displace and turn the valve basket system stem and valve basket.

21 Claims, 6 Drawing Sheets

BALL VALVE

BACKGROUND OF THE INVENTION

1. Field of the Invention

This invention relates to liquid flow control valves and particularly to ball valves.

2. Prior Art

A ball valve involving a resilient ball as taught by the present invention is not new. Examples of such earlier ball valves are shown in patents to Fisher, U.S. Pat. No. 440,025, and Donahue, U.S. Pat. No. 3,176,720. These arrangements for moving a resilient ball over a seat as closure devices have provided for selectively closing off or redirecting a flow through a valve body. However, each teaches axially connected balls that are moved into sealing engagement over a valve seat. The Fisher patent provides for movement of an axially connected ball along opposing tracks. The Donahue patent shows a pivoting arm mounting a resilient ball on an end thereof.

Similar to the present invention, a utilization of an unconnected ball and an arrangement for moving it between seats is shown in patents to Burke, et. al., U.S. Pat. No. 3,368,790, and Morain, et al., U.S. Pat. No. 3,934,849. While these valve structures provide for moving a ball between valve seats, neither alone or in combination, is like the present invention in that neither involves a single control where a quarter rotation will unseat a resilient ball off of a port valve seat, move it into alignment with a second valve port, and will seat that resilient ball over that second valve port.

Distinct from earlier devices, the present invention, to provide movement of the free resilient ball between valve seats, employs, in one embodiment, a clutched cam system and in another embodiment utilizes opposing interacting camming surfaces. In both arrangements, rotation of an activator handle through a quarter rotation only will provide for a vertical displacement to a basket wherein the resilient ball is caged, and a turning of that basket to align the ball with, and reseat it over, another valve port.

Opposing camming surfaces for providing vertical displacement are not new, and some early examples of valves including camming surfaces for providing vertical displacement are shown in patents to Walker, U.S. Pat. No. 444,514; Schuermann, U.S. Pat. No. 900,598; and Bashlin, U.S. Pat. No. 852,155. These patents, however, while they do include opposing camming surfaces, such are not for lifting a rod structure and neither do they involve a mechanism for moving a valve closure mechanism from covering engagement over one port to another, as does the present invention.

SUMMARY OF THE INVENTION

It is a principal object of the present invention to provide a multi-port valve that is capable of selectively directing a fluid flow through different flow paths by the turning of a single handle only.

It is another object of the present invention to provide a ball valve arranged for selectively opening and closing ports through a housing by a turning of a single handle, which handle turning both unseats a ball off from a port seat, and moves it to align with and plugs another selected port, thereby changing the fluid flow path through the valve.

It is another object of the present invention to provide a ball valve that, in a first embodiment, includes opposing camming surfaces, the one camming surface turned by a handle to travel over the other camming surface, so as to urge that other camming surface to separate from the handle turned camming surface, against a spring biasing, thereby lowering a basket end of an arm that is connected to that cam to unseat a resilient ball off from one valve port, the camming surfaces picking up one another to turn the basket and caged ball into alignment for seating over a second valve port, redirecting flow through the valve.

Still another object of the present invention is to provide, as another ball valve embodiment, a clutch cam with the valve handle, whereby, with rotation of the handle, a basket arm that mounts a basket is urged downwardly, that travel initially unseating a resilient ball off from one port, the basket then turning, aligning and seating that ball across another port.

Still another object of the present invention is to provide a ball valve that is simple to construct, has few moving parts, is easily assembled and can be inexpensively maintained over a long useful life.

In accordance with the above objects, the present invention in a ball valve includes a cylindrical housing or body that includes a number of co-planar ports that extend at intervals radially therefrom. Each port terminates within the valve body in a seat. The valve body is open across a top end to receive, in covering and sealed engagement thereover, a valve stem casing that is longitudinally open therethrough and is closed by a cap.

The valve stem casing cap, in a first embodiment, is centrally open to receive a shaft of an actuator handle journaled therein. The shaft extends at a normal angle from the actuator handle end and is for coupling to a neck or stem that extends from a top face of an upper cam. Which upper cam includes a camming surface that is formed as an undersurface thereof and is for fitting in meshing engagement to a like camming surface formed as a top surface of a lower cam. The respective camming surfaces are structured such that, by turning the actuator handle, the one camming surface will move or travel up the other camming surface, spreading the camming surfaces apart. This camming surface travel is opposed by a coil spring that tends to maintain the camming surfaces in close registry. Movement of the one camming surface over the other continues until the side resistance is removed, whereafter the cams turn and travel together. So arranged, the lower cam has a cam neck that extends downwardly therefrom into the valve body and mounts a stem end of a basket that is displaced vertically by the camming surface travel and rotationally when the camming surfaces rotate together.

The valve cap in a second embodiment is also centrally open and is for arrangement across the valve stem end to maintain a handle stem end of a clutch cam assembly. Which stem end is fitted to pivot with actuator handle rotation within that valve stem casing. The actuator handle is for manual movement to pivot or rotate the cam assembly that is fitted to turn within that valve stem casing. The clutched cam assembly of this second embodiment consists of a cylinder that is closed across its upper end by the actuator handle end and has a pair of aligned arcuate sided, essentially isosceles triangle sections removed from the cylinder wall. Which sections are across from one another. A center section of each of the triangle bases is open to the cylinder bottom end, with the remaining portions of the triangle bases to limit travel of ends of a retaining pin that extends at right angles outwardly from opposite sides of a valve basket stem. In this and the first embodiment, the valve basket stem is for installation within the valve stem casing and is spring biased away from the cylindrical body. So arranged, when the actuator handle is rotated, the retaining pin will travel from isosceles triangle apex, along an arcuate side to extend the valve basket stem and basket into the cylindrical body.

The valve basket of both of the embodiments is moved vertically into the cylindrical body on the end of the valve basket stem responsive to manual handle rotation. The valve basket includes mirror image arcuate shaped sides that extend from ends of a sloped web, the basket sides and web to allow the resilient ball to move away and off from a valve seat of the cylindrical housing when the valve basket is lowered into the housing. The valve basket, with continued actuator arm turning, turns with the actuator arm, displacing the resilient ball out of alignment over one valve seat and aligns it with a second valve seat. Whereat, a release of a turning force of actuator handle allows the spring biasing to elevate the valve stem and basket to their original attitudes. In that upward travel the valve basket sides and web tend to urge the resilient ball into sealing engagement over the second valve seat, completing a redirection of flow through the valve.

DESCRIPTION OF THE DRAWINGS

The drawings illustrate that which is presently regarded as the best mode for carrying out the invention.

DETAILED DESCRIPTION

Figure 1:
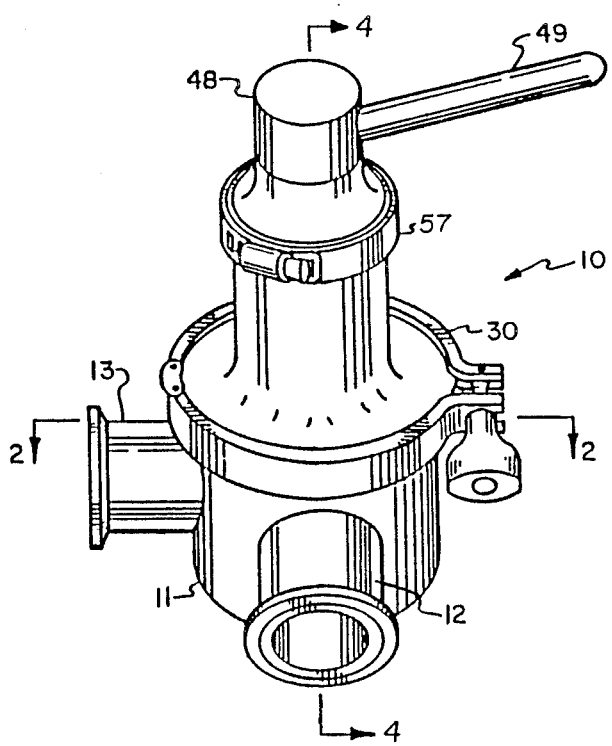
FIG. 1 is a side elevation perspective view of a first embodiment of the present invention in a ball valve, shown as a three-way valve.

FIG. 1 is a view of a first embodiment of a ball valve of the present invention, hereinafter referred to as valve 10 that is shown as a three-way valve. The valve 10 and a valve 80 that is described later herein, are appropriate for use, for example, in a dairy where it is necessary to periodically re-route liquid flows through a single valve. In FIG. 1 and FIGS. 2A, 2B, 2C, and 2D valve 10 is shown to include three ports 12, 13 and 14 arranged at approximately ninety (90) degree increments, with a pocket 20, shown extending outwardly, between ports 12 and 14, from a cylindrical valve body 11 that is closed across its bottom end. The ports 12, 13 and 14 and pocket 20 are essentially planar and are arranged at approximately right angles to one another. It should, however, be understood that a valve body incorporating a greater or lesser of valve ports could be utilized within the scope of this disclosure.

In operation, as illustrated in FIGS. 2A, 2B, 2C, and 2D, an actuator at handle 49 is rotated through increments of ninety (90) degrees, in turn, rotating valve basket 15. The valve basket is shown to include outwardly extending co-planar legs 17a and 17b that straddle to maintain a resilient ball 16 therebetween. The basket is arranged, as set out below, to be both lowered into the valve body and rotated with each ninety (90) degree arc of rotation of actuator handle 49, to move the resilient ball into and out of alignment with first one port and then another port. The resilient ball 16, as will be set out in detail later herein, is to close off each such port to reroute a fluid flow through the remaining ports. This provides three separate paths of flow through the valve body and when the resilient ball is positioned in pocket 20 the ball will float freely allowing a flow to pass through all three ports for clean out.

Shown in FIGS. 2A through 2D, the valve basket 15 preferably includes a forward sloping center web 18 wherefrom the legs 17a and 17b extend, with a valve stem 19 secured to extend upwardly at essentially a normal or upright angle. The valve basket, as set out in more detail hereinbelow, is to be both displaced vertically and turned by rotational movement of valve basket stem 19, which valve basket stem turning occurs when the actuator handle 49 is turned through ninety (90) degree increments of arc.

Figure 2A:
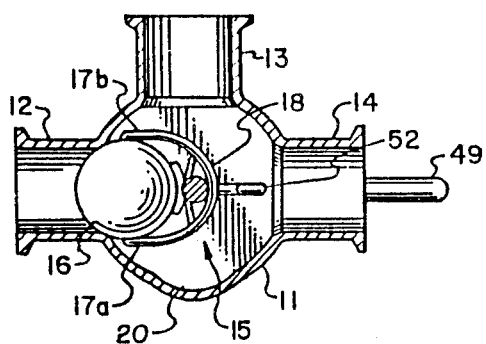
FIG. 2A is a top plan section view taken along the line 2—2 of FIG. 1 showing a valve basket maintaining a resilient ball between sides or legs thereof, the resilient ball closing off one of three valve ports of a valve body.
Figure 2B:
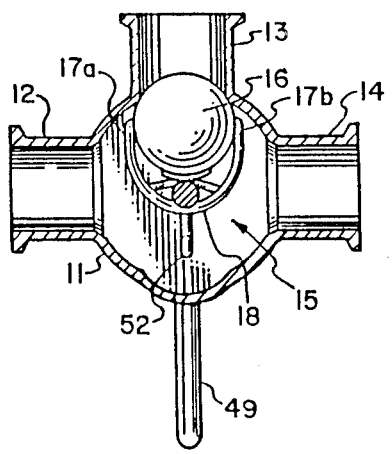
FIG. 2B is a view like FIG. 2A only showing the valve gate and the resilient ball as having moved to close the valve middle port.
Figure 2C:
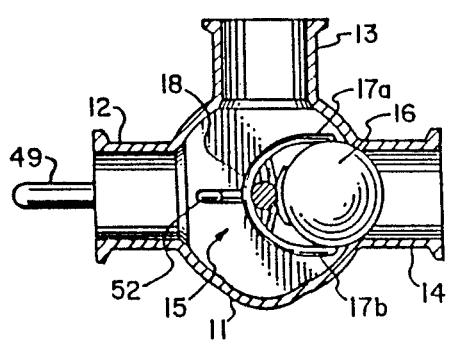
FIG. 2C is a view like FIGS. 2A and 2B only showing the valve gate and resilient ball as having moved to close the third port.
Figures 2D, 3:
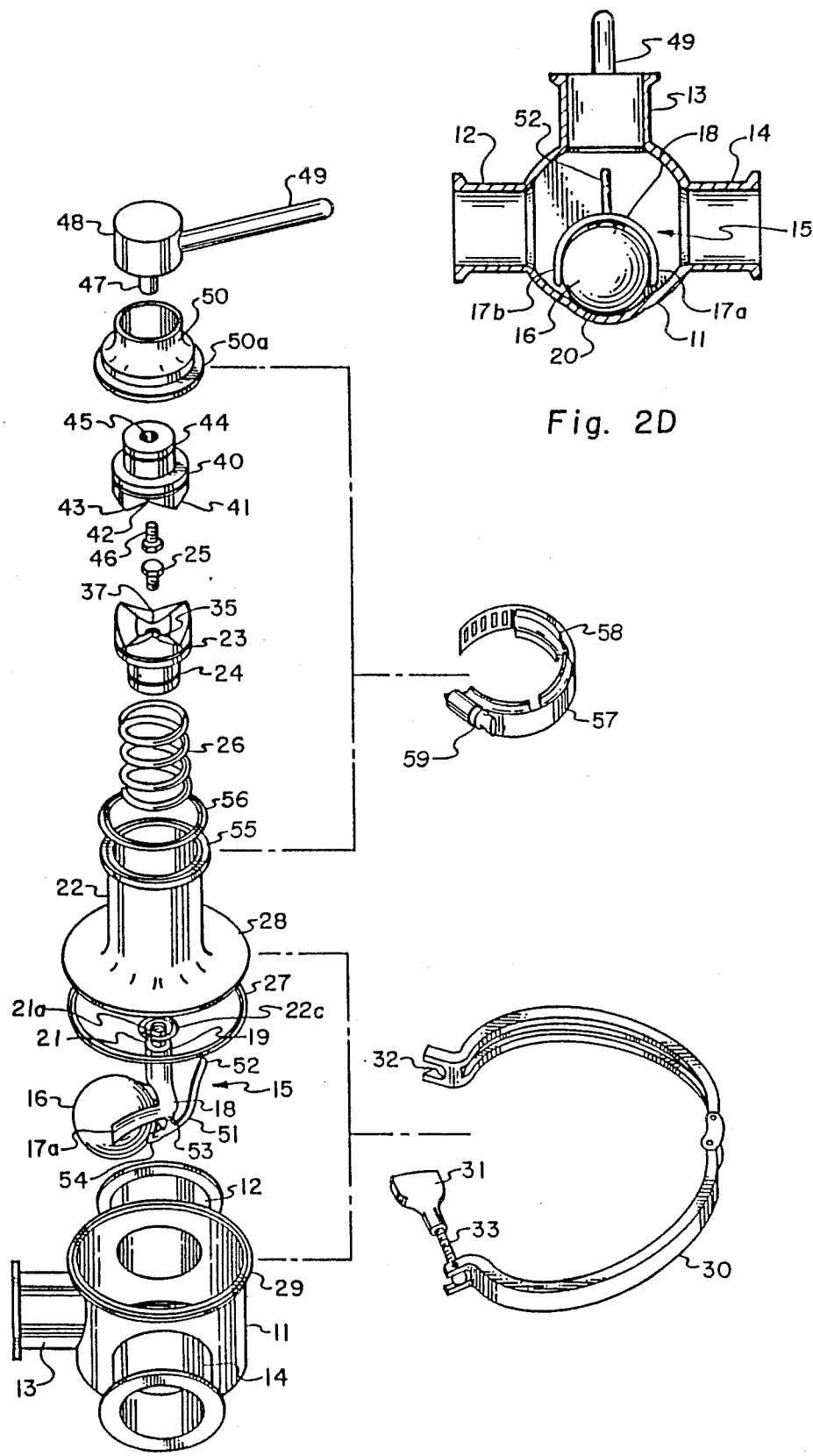
FIG. 2D is a view like that of FIGS. 2A, 2B and 2C and shows the resilient ball shown seated in a pocket that is formed in the valve body, the three ports, open to pass flow therethrough.
FIG. 3, is an exploded view of the ball valve of FIG. 1.

FIG. 3 shows an exploded view of the preferred gate valve 10 as set out above, as including the described cylindrical valve body 11, that contains the valve basket 15 with the resilient ball 16, maintained between legs 17a and 17b. The resilient ball 16 to travel or roll freely back and forth between which basket legs. The valve basket stem 19 that, as set out above, extends at a right angle from the basket web 18, is shown to terminate in a lesser diameter neck area 21 that is longitudinally center holed and tapped at 21a to receive a bolt turned therein. Valve basket stem 19, as shown in the sectional views of FIGS. 4A through 4D, is for fitting in sliding arrangement through a center opening formed in a base 22a of a valve stem casing 22. The valve basket stem is telescoped into a central longitudinal opening that is formed through a neck or stem end 24 of a lower cam 23. A bolt 25 is provided for joining the undersurface of the lower cam 23 to the valve basket stem 19, that bolt 25 for fitting through a top end of a lower cam longitudinal passage and is turned into the tapped hole 21a that is formed in the gate valve stem neck 21.

Shown best in FIG. 3, the valve 10 includes a cam biasing spring 26, that is shown as a coil spring, that, prior to the joining of the valve basket stem to the lower cam, is to be telescoped over the valve basket stem. The cam biasing spring is compressed between the undersurface of the lower cam 23 and the stem casing base 22a, as shown best in FIGS. 4A through 4D. Which compression takes place when the valve basket stem is urged into the valve body, as will be explained in detail hereinbelow with respect to a discussion of valve operation. Additionally, as shown best in FIG. 3, a gasket 27 is provided for arrangement as a liquid tight seal between the undersurface of an outwardly flared portion 28 of the valve stem casing 22, and a lip 29 that is formed around the open top of the valve body 11.

In assembling the valve 10, the valve stem casing 22 is fitted over the open top portion of the valve body 11, sandwiching the gasket 27 therebetween, with a clamp 30 for fitting and tightening therearound. The clamp 30, preferably involves arcuate jaws that are centrally hinged to close around and over the respective valve body lip 29 and the edge of the outwardly flared portion 28 of the valve stem casing. The one clamp jaw end includes a threaded shaft 33 that extends therefrom and includes a knob 31 that is shown turned onto the shaft end. Which threaded shaft 33 opposite end, is pivotally connected to the one clamp jaw end. The knob 31 of that threaded shaft 33 is to fit into a slot 32 that is formed in the other clamp jaw end. So arranged, turning of the knob 31 moves its undersurface against the edges or sides of slot 32 and provides for drawing the clamp jaw ends together.

Figure 6:
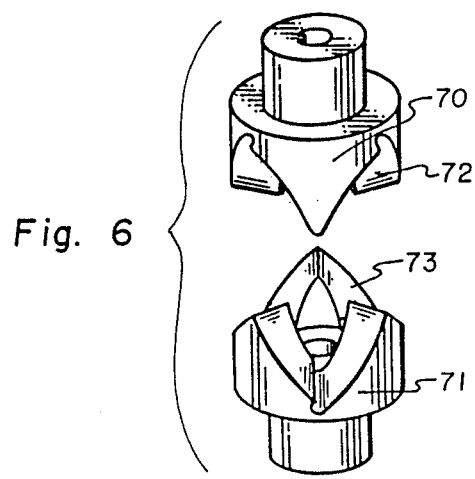
FIG. 6 is a view of another embodiment of opposing camming surfaces for use with the first embodiment of the ball valve of FIG. 3.

Shown in FIG. 3 and FIGS. 4A through 4D, the lower cam 23 includes, an upper or top camming surface that consists of a series of four (4) equal sided triangular pie shaped segments 37. The segments have identical inclines and declines, forming a series of depressions and peaks that are at approximately forty five (45) degree intervals to one another around a full circle. It should, of course, be understood that, within the scope of the disclosure, a different arrangement of inclines and declines to form peaks and depressions could be employed. An example of another such arrangement is shown in FIG. 6 and will be discussed later herein.

Figure 4A:
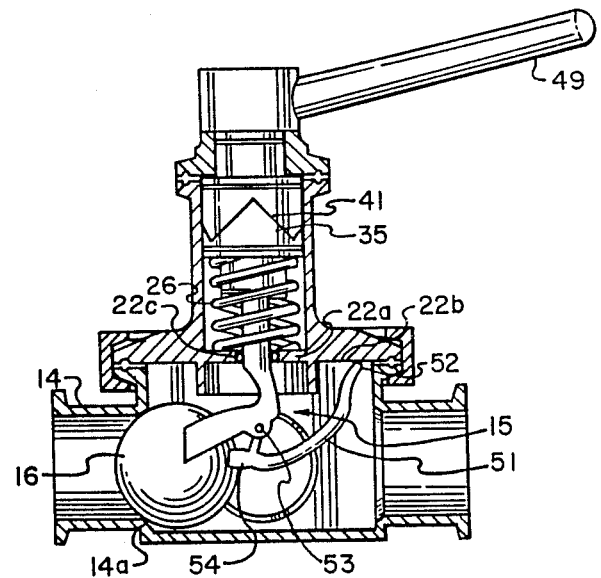
FIGS. 4A through 4D are side elevation sectional views of the first ball valve embodiment of FIG. 1 taken along the line 4—4, showing the valve basket and resilient ball being moved by the actuator handle in ninety (90) degree increments of arc.
Figure 4B:
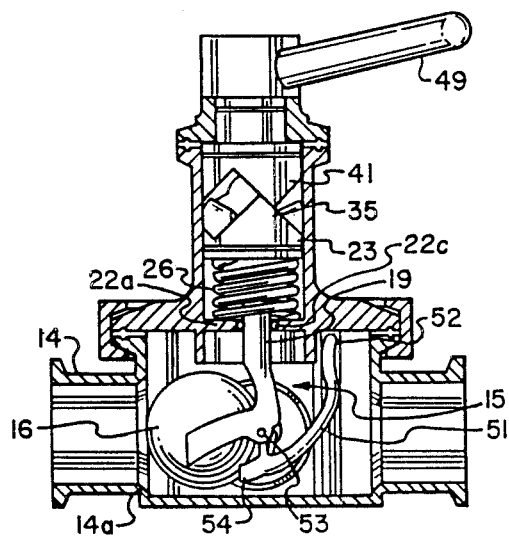
Figure 4C:
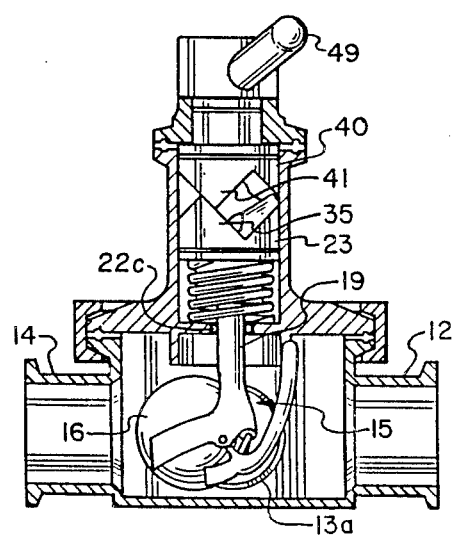
Figure 4D:
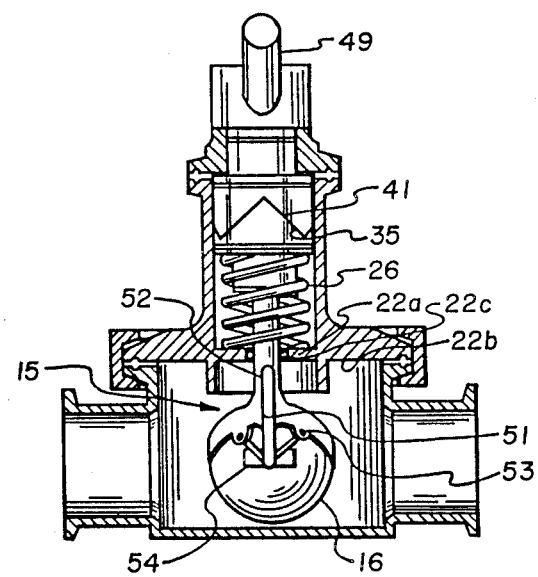

Shown in FIG. 3, the upper cam 40 includes a bottom or undersurface that is a camming surface 41 that is identical to the camming surface 35 of the lower cam 23, having valleys 42 and peaks 43, to fit in flush engagement with camming surfaces 35. The upper and lower camming surfaces 42 and 35, respectively, when meshed together, provide a least thickness or distance thereacross, as shown in FIGS. 4A and 4D. FIGS. 4B and 4C show the respective camming surface as having spread apart. This cam action or function and its effect will be described in detail hereinbelow.

Shown best in FIG. 3, like the lower cam 23, the upper cam 40 involves a neck or stem 44 extending at a right angle from a top surface thereof that is longitudinally center holed at 45 to receive a bolt 46 fitted therethrough. The bolt is turned into an open threaded end of a shaft 47 that extends at a right angle from the center of an actuator handle head 48. The actuator handle head 48 includes an actuator handle 49 projecting outwardly at essentially a right angle from the side thereof, which handle is for manual turning by an operator, not shown. Rotational movement of the actuator handle 49 moves the connected upper cam as described hereinbelow.

In FIGS. 2A through 2D, and 4A through 4D the actuator handle 49 is shown as facing oppositely to the opening between basket legs 17a and 17b. This arrangement is a matter of preference only and the actuator handle could be arranged to point in the same direction as do the basket legs 17a and 17b, or could be arranged ninety (90) degrees thereto, within the scope of this disclosure.

Shown best in FIG. 3, a cap 50 is provided to close over a valve stem casing crown end 55, in sealing engagement thereover. To provide cap 50 sealing, a gasket 56 is sandwiched between the aligned stem casing crown end 55 and the cap 50 undersurface, at its edge 50a, and the assembly is held in place by closure of a clamp 57 fitted therearound. A preferred clamp 57 is similar to a conventional hose clamp, that includes a belt having lateral slots formed at spaced intervals therealong, the slots to receive threads of a screw 59 turned therein, which screw is mounted to the other belt end. The inner surface of which belt includes spaced apart inwardly facing flanges 58, arranged proximate to the top and bottom belt edges, the flanges to engage and pull together the edges of the cap 50 and valve stem casing crown end 55 when the belt is tightened therearound.

As set out hereinabove, the basket legs 17a and 17b and web 18 are preferably sloped or contoured appropriately to conform to the curve of the resilient ball surface. Such slope or contour is to allow the resilient ball 16, when the valve basket stem 19 is urged into the valve body 11, to move rearwardly off from a valve port. That slope or contour, when the valve basket 15 is elevated, to urge that resilient ball against and in covering engagement over valve body 11 ports 12, 13 or 14. Where the resilient ball seating over a port must overcome a high pressure flow it may be desirable to also provide a ball check lever 51 arranged with the valve basket 15 for additionally urging that resilient ball 16 into seating engagement. Such ball check lever 51 is shown in the exploded view of FIG. 3, and in FIGS. 4A through 4C. In FIG. 3 the ball check lever 51 is shown as a bar that is centrally bent or curved into a dogleg with a head or top end 52 to engage to slide freely along a flat undersurface 22b of the valve stem casing base 22a, as shown best in FIGS. 4A through 4C. The ball check lever 51 is mounted to pivot around its pivot coupling 53 to the basket web 18, which pivoting moves a foot end 54 of that ball check lever against the resilient ball 16.

Valve 10 functioning is illustrated best in FIGS. 4A through 4D. With the valve 10 in the attitude shown in FIGS. 4A, movement of the upper camming surface 41 over the lower camming surface 35, responsive to turning of the actuator handle 49 through approximately ninety (90)degrees, as shown in FIG. 4B, causes that upper camming surface to travel up the straight sloping surface of the lower camming surface 35. As shown in FIGS. 4B and 4C, this travel increases the spacing or distance across the camming surfaces. The cam biasing spring 26 is thereby compressed and the valve basket stem 19 is lowered into the valve body 11. As shown, the valve basket 15 is secured to the valve basket stem and pivotally connects at 53 to the ball check lever 51. Lowering the valve basket thereby allows the ball check lever head or top end 52 to travel inwardly towards the valve basket stem, along the flat surface 22b of the valve stem casing base 22a. The ball check arm foot end 54 is thereby moved downwardly along the resilient ball 16 surface allowing it to roll into the basket, out of engagement with a valve port. The ball check lever 51 is thereby pivoted from the attitude shown in FIG. 4A to that shown in FIG. 4B. In FIG. 4B the resilient ball connecting foot end 54 of the ball check arm 51 is shown to have descended, the resilient ball shown as having rolled away from the valve port.

FIG. 4B shows a maximum or highest point of travel of the upper camming surface 41 over the opposing lower camming surface 35. Whereat, a maximum displacement of the one camming surface from the other is provided and the resilient ball 16 is displaced off of the valve port, eliminating a resistance to rotation of the valve basket 15. At this point, the valve basket is free to rotate with continued actuator handle 49 rotation. The upper camming surface thereby picks up the lower camming surface, as shown in FIG. 4C. Additional actuator handle rotation then causes the camming surfaces to rotate together. The valve basket 15 is thereby moved from alignment with one valve port into alignment with a next valve port.

FIG. 4D shows the actuator handle 49 as having rotated through approximately ninety (90) degrees from the attitude shown in FIG. 4A. When the valve 10 is configured as shown in FIG. 4D, absent continued actuator handle 49 turning, the cam biasing spring 26 urges the lower camming surface 35 to move along the upper camming surface 41 so as to reconfigure the camming surfaces to the meshing engagement shown in FIG. 4A. The valve basket stem 19, in returning to the attitude shown in FIG. 4A, provides a lifting of the valve basket 15 to where it again comes to rest in approximately a horizontal plane across the center of the resilient ball 16. In this attitude, the ball check lever head or top end 52 will have traveled outwardly away from the valve basket stem, along the flat undersurface 22b of the valve stem casing bottom 22a. This ball check lever 51 pivotal movement moves the foot end 54 thereof against, and seat resilient ball 16 to urge it against, and seat over the valve port it is aligned with.

As set out above, actuator handle 49 turning results in opening of one valve port and closing of another. This is the case except when actuator handle 49 is turned so as to move the resilient ball into the valve body pocket 20. In which configuration all the valve ports will be open to flow. When a turning force on the actuator handle is released, the cam biasing spring 26 moves the lower surface 35 along the upper camming surface 41 so as to restore the original alignment attitude of the respective camming surfaces. At no time in valve 10 functioning will the peaks of the one camming surface travel over the peaks of the other.

Figure 5:
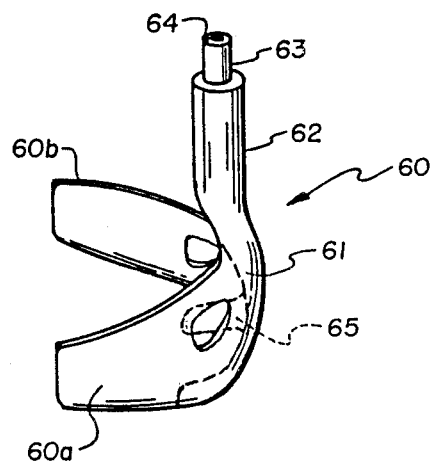
FIG. 5 is a view of another embodiment of a valve basket.

FIG. 5 illustrates another configuration of a valve basket 60. Valve basket 60, it should be understood, will function as described with respect to the description of valve gate 15 function, discussed with respect to FIGS. 1 through 4D. Except that valve basket legs 60a and 60b and web 61 are themselves sloped or arcuate shaped to urge the resilient ball 16 into a valve port when a valve basket stem 62 is moved into the valve body, as described with respect to valve basket 15 operation. Shown in FIG. 5, valve basket stem 62 is stepped, proximate to a top end, to a lessor diameter neck 63, that is longitudinally holed at 64, and is for connection as described above with respect to a description of valve basket 15, to a shank end of lower cam 23. The valve basket 60, like valve basket 15, can be installed in the valve 10 assembly and is preferred for inclusion with valve 80, as will be described in detail hereinbelow.

The above described embodiment of valve 10 shows opposing camming surfaces of the upper and lower cams as a series of peaks and valleys formed by successive equal inclines and declines that slope radially from around the cam center. Straight sided isosceles triangular segments are thereby formed around a full circle. Alternatively, FIG. 6 shows another embodiment of upper and lower cams 70 and 71, respectively, that are essentially alike and are to perform the same function as do the earlier described upper and lower cams 40 and 23, respectively. Except, the cams 70 and 71 opposing camming surfaces, 72 and 73, respectively, are curved or arcuate in shape. Further, the opposing camming surfaces 72 and 73 preferably involve three (3) triangular shaped segments. As shown in FIG. 6, the upper and lower camming surfaces 72 and 23 sides are slightly curved radially from the cam center to outer circumferences, appearing as opposing spirals. With this configuration, when the one camming surfaces moves up and along the other, the curved surfaces provide for the one surface sliding smoothly over the other. In this movement, the one camming surface tends to twist as it ascends the other, to the point of travel where the valve basket is freed to travel and the camming surfaces thereafter turn together. The curved camming surfaces 72 and 73 are to provide a more uniform force application to the valve gate stem so as to effect a smooth release as a cam biasing spring returns the camming surfaces to their original positioning. A valve incorporating the described opposing curved or spiral camming surfaces 72 and 73 thereby presents a more constant resistance to travel of the actuator handle than is provided with the described camming surfaces 35 and 41. This second embodiment of cams 70 and 71 having curved opposing camming surfaces 72 and 73 can, within the scope of this disclosure, be utilized in place of the cams 23 and 40 of FIG. 4A through 4D.

Figure 7:
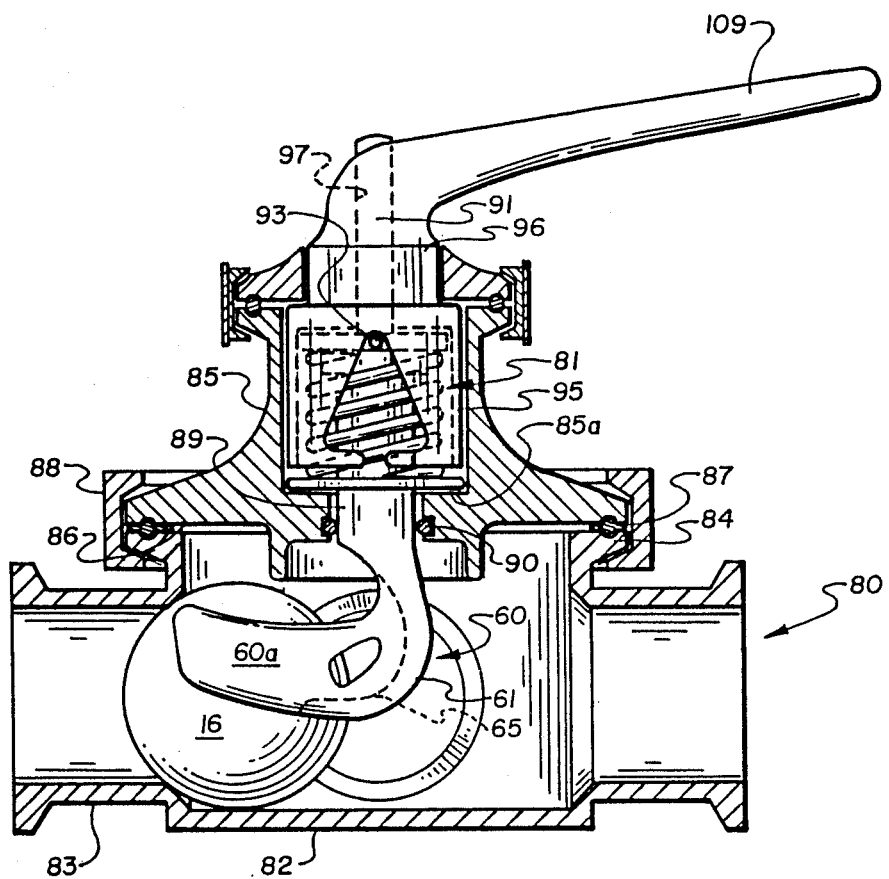
FIG. 7, is a broken away side elevation view like FIG. 4A, of another or second embodiment of a ball valve of the present invention.
Figure 8:
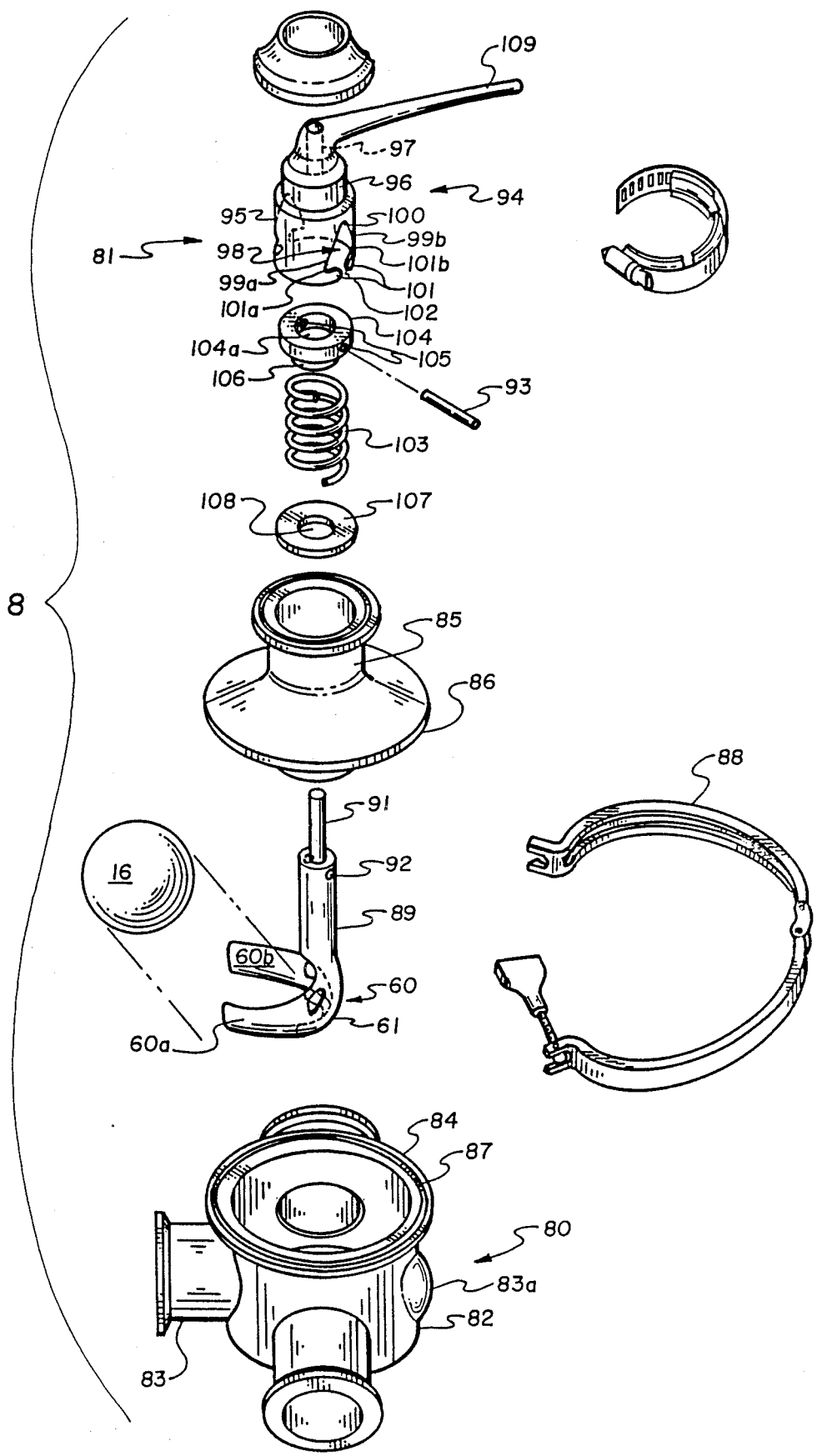
FIG. 8 is an exploded view of the ball valve of FIG. 7.

Hereinabove have been set out a description of arrangements of upper and lower cams having different configurations of opposing camming surfaces for providing valve basket and stem vertical and rotational travel. FIGS. 7 and 8 show an arrangement of a cam clutch system 81 of a ball valve 80 that is also for providing the required valve basket stem and valve basket vertical and rotational travel.

FIG. 7 shows a side elevation sectional view of the ball valve 80, hereinafter referred to as valve, that is like the view of valve 10 of FIG. 4A. Like valve 10, valve 80 includes a cylindrical valve body 82 that has co-planar ports 83, shown as three open ports, that extend around the valve body 82, which valve body may also include a pocket 83a that is like pocket 20 of FIGS. 2A through 2D. The valve body 82 is closed across its bottom end and is open at a center opening in its top end. Like valve body 11, valve body 82 preferably includes a flat lip 84 that is formed around its top end, adjacent to the center opening. The valve body flat lip 84 is to receive a flat surface 86 of a flange end 85a of a valve stem casing 85, sandwiching a gasket 87 therebetween. Like the valve 10, a clamp 88 that is preferably like clamp 30, is installed, as described above, for maintaining this sandwich coupling. Like the valve stem casing 22, the valve stem casing 85 is for containing a valve basket stem 89 so as to allow it to move vertically and turn therein. The valve basket stem is preferably a straight cylindrical staff that mounts valve basket 60, as shown also in FIG. 5, on its lower end. Shown in FIG. 7, an O-ring seal 90 is preferably arranged around a center hole through the flange end 85a of the valve stem casing 85 that is for engaging and sealing against the side of the valve basket stem. So arranged, a fluid flow from the valve body along the valve basket stem is blocked at the O-ring 90 and by the valve body by gasket 87.

Shown best in FIG. 8, the cylindrical valve basket stem 89 is stepped inwardly at its top end into a cylindrical guide pin 91 that extends longitudinally from the center thereof. Below which guide pin, the valve basket stem includes a lateral hole 92 that is for receiving a retaining pin 93 fitted therethrough. The cylindrical guide pin 91 is to telescope through an open cylindrical portion 95 of actuator handle 94 and through a guide hole 97 that, as shown in broken lines, is formed through a collar end 96 of the actuator handle 94. The valve basket stem 89 is thereby maintained at its guide pin end 91 and at O-ring seal 90 in the valve stem casing 85 to move vertically and to turn or rotate so as to displace basket 60 and resilient ball 16, as described earlier herein with respect to a description of the operation of valve 10, and as illustrated in FIGS. 4A through 4D.

To provide the required turning and vertical displacement to the valve basket stem 89, as shown best in FIG. 8, the actuator handle cylindrical portion 95 includes aligned triangular shaped segments 98 that have been removed from opposite sides of the cylinder wall. The identical triangular segments are essentially isosceles triangles that have equal slightly arcuate left and right sides 99a and 99b and meet in a center apex 100, with left and right corners 101a and 101b of a base 101. The corners 101a and 101b constitute cam locking hooks whose function is set out hereinbelow.

The triangle base 101 is shown as open at 102 to the cylinder end, which opening allows for passage of the retaining pin 93 therethrough to assemble the cam clutch system 81 as set out below. To provide vertical and rotational displacement to the valve basket stem 89, that stem is installed into the actuator handle cylindrical portion 95. The retaining pin 93 ends to seat in the triangle segment apexes 100 when that valve basket stem 89 is fully telescoped into that cylindrical portion 95. This attitude is maintained by a coil spring 103 wherethrough the valve basket stem 89 is fitted. The top or upper end of which coil springs 103 is crowned by a retainer 104 that has a center hole 104a therethrough to accommodate the valve basket stem. The retainer 104 is also holed laterally at 105 to accommodate the retaining pin 93 ends fitted therethrough. The retainer is also stepped inwardly at 106, inset from its lower circumference, to accommodate the coil spring 103 top or upper end telescoped therein. So arranged, the coil spring top will travel with the retainer 104, with the retaining pin 93 and the valve basket stem 89 telescoped therein. The coil spring opposite or other end rests on a thrust bushing 107 that is center holed at 108 to accommodate the valve basket stem fitted therethrough. The thrust bushing 107, as shown best in FIG. 7, is seated on the valve stem casing base 85a and is arranged to allow the coil spring 103 end to slide freely over the uppersurface thereof during rotation or turning of the cam clutch system 81.

In operation, the retaining pin 93 of the cam clutch system 81 is urged by the coil spring 103 into the triangle segment apexes 100 of the cylindrical portion 95. This is, of course, the attitude shown in FIG. 8. To move the valve basket stem 89 and basket 60 into the valve body, against the biasing of coil spring 103, like the arrangement of the valve basket 15 of valve 10 shown in FIG. 4B, a hand engaging beam or bar 109 of the actuator handle 94 is manually turned. In that turning the retaining pin 93 will travel downwardly from the cylinder triangular segment apex 100 along a left or right side wall 99a or 99b to come to rest in the junction or corner of the triangular segment side wall 99a or 99b and base 101 identified as the left or right cam limiting hook 101a or 101b. In that travel the valve basket stem 89 will have moved, against the biasing of coil springs 103, to a limit of travel into the valve body 82. This is essentially the same attitude that is shown for valve basket 15 of valve 10 as shown in FIGS. 4B and 4C. In which attitude, the resilient ball 16 will have moved off of valve port 14. With continued bar 109 turning, a positive locking of the actuator handle 95 and valve basket stem 89 is effected by the seating of retaining pin 93 in a cam limiting hook 101a or 101b, and the valve basket stem and basket 60 thereafter turn with the actuator handle to the attitude shown for valve 10 in FIG. 4D. In that turning, the coil spring 103 turns with the valve basket stem, with the coil spring lower end sliding along the upper surface of the thrust bushing 107 that is supported on the valve basket casing base 85a. At the attitude shown in FIG. 4D, with a removal of the turning force on the actuator handle 94, the biasing force exerted by coil spring 103 urges the valve basket stem 89 back to the attitude shown in FIG. 8. The retaining pin 93 is thereby moved upwardly along a triangular segment side 99a or 99b to apex 100. Whereat, the basket legs and web curvature, as shown best in FIG. 5, will have urged the resilient ball 16 into tight covering engagement over a valve port.

Applicant hereinabove has set out the preferred embodiments of flow control valves of the present invention, with alternative embodiments of valve baskets and opposing cams, and a cam clutch system, that are all for vertically moving and turning a valve basket. Accordingly, while preferred forms of the invention have been shown and described herein, it should be understood that the invention may be embodied in other arrangements without departing from the spirit or essential character as shown and described. The present disclosure therefore should be considered in all respects to be illustrative and is made by way by example only and that variations thereto are possible without departing from the subject matter and reasonable equivalent thereof coming within the scope of the following claims, which claims I regard as my invention.

I claim:

1. A flow control valve comprising, a valve body that is open across one end and includes at least a pair of planar open valve ports arranged therein; a casing means and means for coupling it to close over in sealed engagement said valve body open end; an actuator means journaled to turn within said casing means; means for turning said actuator means; a valve basket means extending into said valve body to maintain and move a resilient ball to align it with each said valve port, said resilient ball having a sufficient diameter to close over each said valve port; means arranged between said actuator means and said valve basket means for both longitudinally displacing said valve basket means into said valve body and turning said valve basket means between valve ports, when said actuator means is turned; and biasing means arranged with said valve basket means for opposing longitudinal displacement of said valve basket means when a turning force is removed from said actuator means.

2. A flow control valve as recited in claim 1, wherein the valve body includes three identical spaced apart planar valve ports.

3. A flow control valve as recited in claim 1, wherein the casing means and valve body each include flanges around openings therethrough that have surfaces that will align to receive a means for closing in sealing engagement, said opposing flange surfaces together.

4. A flow control valve as recited in claim 1, wherein said casing means is longitudinally open therethrough and its opposite end to its connection to the valve body is closed by a cap means secured thereto in sealing engagement, said cap means to accommodate the actuator means journaled therethrough.

5. A flow control valve as recited in claim 1, wherein the means for turning the actuator means is a handle that is secured to extend outwardly from said actuator means.

6. A flow control valve as recited in claim 1, wherein the means for both longitudinally displacing and turning the valve basket means and stem consist of, first and second cam means individually stacked in said valve stem casing, said first cam means connected to be turned by said actuator means, and said second cam means is connected to said valve basket means stem, said first and second cam means each having identical opposing camming surfaces, each of which camming surfaces involves at least one incline followed by a decline such that travel of the one camming surface over the other will increase the spacing distance therebetween.

7. A flow control valve as recited in claim 6, wherein the first and second cam means are identical to one another, and each includes a neck portion that faces oppositely to its camming surface, said neck portion of said first cam means for coupling to the actuator means so as to be turned thereby, and said neck portion of said second cam means to be coupled to an end of the valve basket means stem.

8. A flow control valve as recited in claim 6, wherein each first and second cam means is a flat cylinder having a camming surface that consists of identical segments that extend at equal intervals radially from the center of the cylinder top face, forming a series of equal straight sides rising and declining surfaces.

9. A flow control valve as recited in claim 8, wherein each camming surface consists of four identical segments.

10. A flow control valve as recited in claim 6, wherein each cam means is a flat cylinder having a camming surface that consists of identical segments that extend radially from the center of the cylinder top face, forming a series of equal arcuate rising and declining surfaces, said surfaces each to present a slight inward spiral.

11. A flow control valve as recited in claim 10, wherein each camming surface consists of three identical segments.

12. A flow control valve as recited in claim 1, further including a stem that extends from the valve basket means, is journaled in the casing means, and connects to the means for both longitudinally displacing and turning, said valve basket means.

13. A flow control valve as recited in claim 12, wherein the valve basket means stem extends at approximately a right angle from the valve basket means, said valve basket stem for connection to the second cam means, opposite to its camming surface.

14. A flow control valve as recited in claim 13, wherein the valve stem casing includes a centrally open inwardly extending interior flange for receiving the valve basket means stem fitted therethrough; and a means for urging the camming surfaces into meshing engagement consisting of a coil spring that is compressed and telescoped over the basket valve means stem, the one end of said coil spring to engage said valve stem casing flange with the other said coil spring end to engage the second cam means cylinder undersurface.

15. A flow control valve as recited in claim 12, wherein the mean for both longitudinally displacing and turning the valve basket means and stem is a cam clutch system consisting of, a cylinder that is connected at a top end to the actuator means, a pair of aligned essentially isosceles triangular shaped sections having been removed from said cylinder wall, and a center portion of the base of each of said triangular shaped section is open to the end of said cylinder; and the valve basket means stem is a section of rod that has the valve basket means secured across one end, and includes a lateral hole formed through its opposite end for receiving a retaining pin fitted laterally therethrough, the retaining pin to extend equally from both sides of said valve basket means stem each retaining pin end to travel along one of the pair of triangular section sides, vertically displacing the connected valve basket means and stem therewith.

16. A flow control valve as recited in claim 15, wherein the biasing means is, a coil spring that is for telescoping over the valve basket means stem; and a retainer ring to seat on an upper end of said spring means that is open centrally and includes a lateral hole means formed therethrough for receiving the retaining pin ends.

17. A flow control valve as recited in claim 15, further including a guide pin that extends axially from the valve basket means stem end that is for fitting within a guide hole that is formed through the actuator means.

18. A flow control valve as recited in claim 12, wherein the valve basket means includes a cylindrical rod extending at a normal angle from a web thereof as the stem; and the valve basket means consists of a pair of planar arms that extend essentially parallel from ends of said web that connects to said cylindrical rod end, which said planar arms are oppositely concave to have opposing surfaces that are essentially segments of a sphere to accommodate the surface of the resilient ball positioned therebetween, with said web also curved to slope from the vertical towards the opening between said arms.

19. A flow control valve as recited in claim 1, further including a ball check means arranged with the valve basket means for engaging the side of the resilient ball so as to urge it towards a valve body port when a turning force on said actuator means is removed.

20. A flow control valve as recited in claim 19, wherein the ball check means is a bar that is pivotally connected to a web of the valve basket means, which bar includes a foot that is secured across its end to extend between planar arms of said valve basket means, a curve of the foot conforms to the curve of the surface of the resilient ball.

21. A flow control valve as recited in claim 20, wherein the ball check means end opposite to its curved foot end contacts to travel along the undersurface of an inwardly extending flange of the valve stem casing.

* * * * *